Jan. 13, 1959
W. P. ADAMS
2,867,966
HAY RAKE
Filed March 7, 1956
3 Sheets-Sheet 1
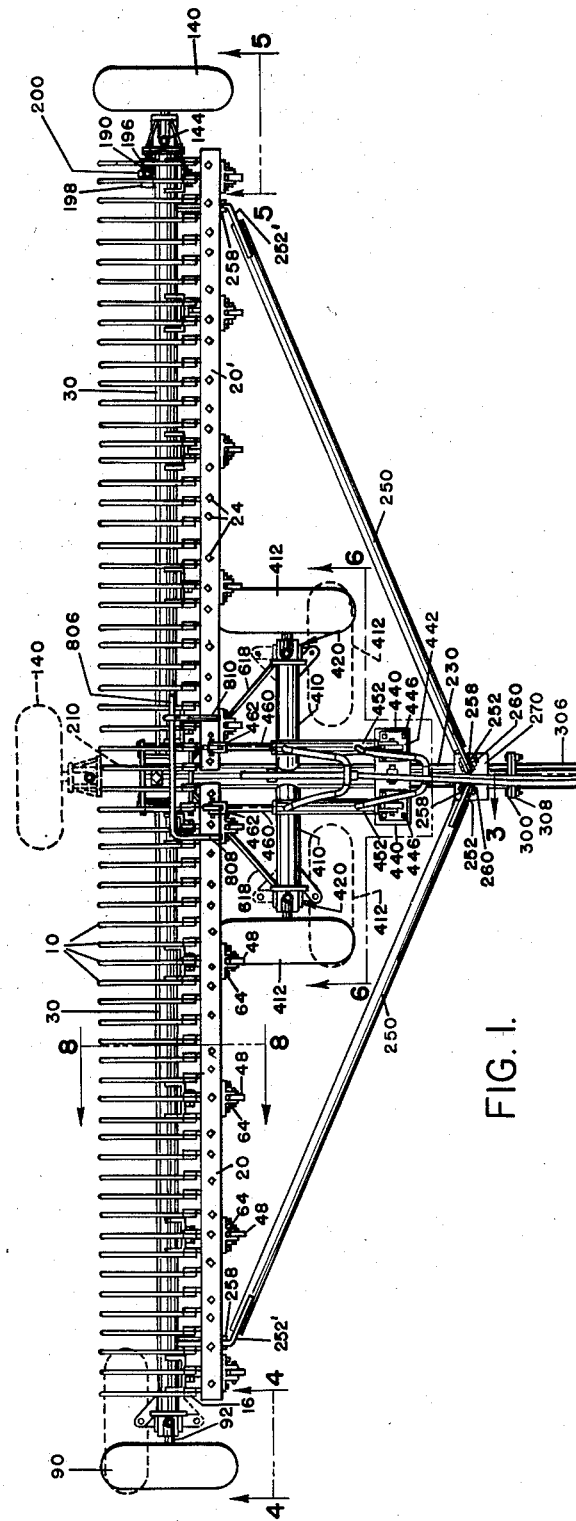
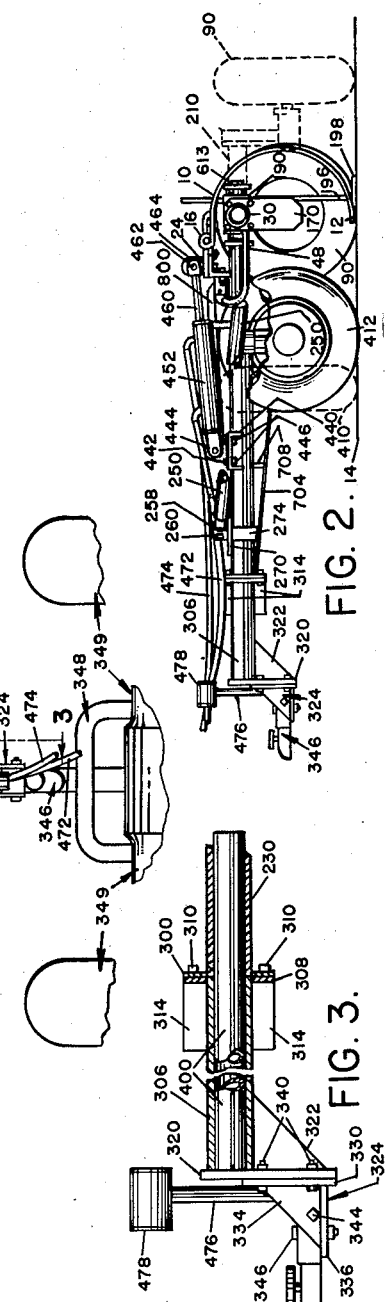
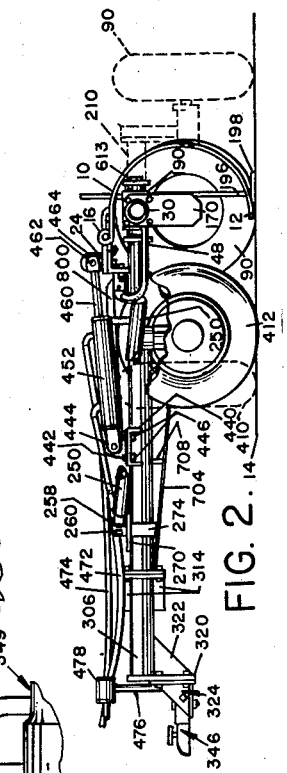
INVENTOR.
WAYNE P. ADAMS
BY Jan. 13, 1959 W. P. ADAMS 2,867,966
HAY RAKE
Filed March 7, 1956 3 Sheets-Sheet 2

INVENTOR.
WAYNE P. ADAMS
BY

Jan. 13, 1959   W. P. ADAMS   2,867,966
HAY RAKE
Filed March 7, 1956   3 Sheets-Sheet 3
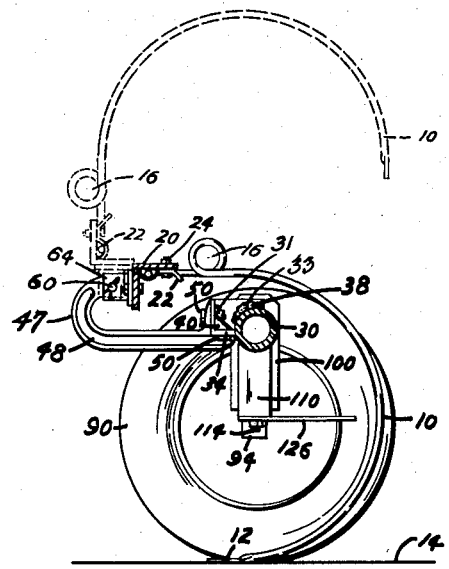
FIG. 8.
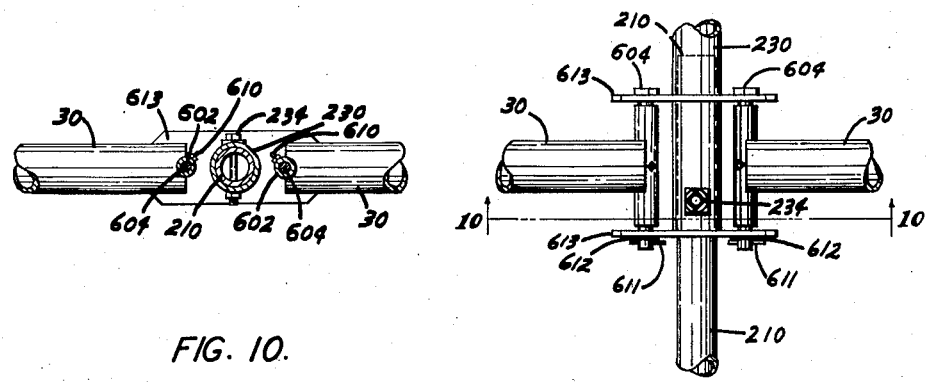
FIG. 10.
FIG. 9.
INVENTOR.
WAYNE P. ADAMS
BY United States Patent Office 2,867,966
Patented Jan. 13, 1959

2,867,966

HAY RAKE

Wayne P. Adams, Alliance, Nebr.

Application March 7, 1956, Serial No. 570,067

2 Claims. (Cl. 56—384)

This invention relates to hayrakes and more particularly it is an object of this invention to provide a hayrake adapted for use in fields in which varying conditions of hay growth, irregular ground surface, and obstructions are encountered.

It is another object of this invention to provide an improvement on the hayrake described in the applicant's issued Patent No. 2,672,721, granted March 23, 1954.

It is a particular object of this invention to provide an improved arrangement of parts in a short coupled hayrake whereby the forward upper ends of the teeth are supported from a position disposed forwardly of the transverse wheel supported frame members or half-axle members so as to provide a rake having fewer parts and better construction.

Another object is to provide a short coupled hayrake whereby parts formerly provided for cleaning the teeth are now eliminated which results in economy of construction, the function of these parts being served by the transverse frame members or half-axles themselves.

A particular object of the invention is to provide a rake with a reliable hold down mechanism whereby the rake will pull great amounts of hay, raking clean and close to the ground, and whereby the height of the teeth can be regulated and quickly changed.

Another object resides in the provision of a rake which can be trailed behind a vehicle at highway speed having adjustable wheel positions for making possible this objective.

Yet another object of the invention is to provide a device for the purpose described which is sturdy and durable in construction, reliable and efficient in operation, and relatively simple and inexpensive to manufacture, assemble and utilize.

This application is a continuation in part of the applicant's co-pending patent application Serial No. 246,582, filed September 14, 1951, and now abandoned.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

Fig. 1 is a top plan view of the hayrake of this invention, highway positions of the wheels being shown in dotted lines, attached to tractor for towing;

Fig. 2 is a right end elevation of the rake of Fig. 1;

Fig. 3 is an enlarged fragmentary view with parts broken away and shown in section of the towing tongue portion of the rake as seen in Fig. 2;

Fig. 8 is a view-in-section as seen along the line 8—8 of Fig. 1, an upper position of the teeth being shown in dotted lines;

Fig. 9 is an enlarged fragmentary top plan view showing how the half-axle or transverse frame members are pivotally secured to the center frame section of the rake; and Fig. 10 is a view-in-section taken along the line 10—10 of Fig. 9.

Figure 4:
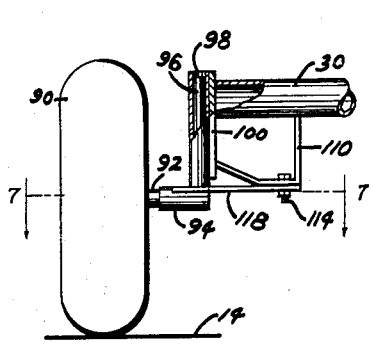
Fig. 4 is a view of the left wheel as seen along the line 4—4 of Fig. 1, with parts broken away and shown in section for clarity.

The hayrake of this invention is best seen in Fig. 1 and includes a plurality of teeth 10.

The teeth 10 are disposed in a transverse row and are supported above the ground with their lower ends extending downwardly to the surface of the ground for raking. As best seen in Fig. 8, each tooth is of arcuate shape having a concave forward side terminating at its lower end in a flat portion generally indicated at 12. The portion 12 is disposed in use closely adjacent the surface of the ground 14.

Each tooth is constructed of resilient material and is preferably provided with a loop 16 disposed therein adjacent the top thereof for adding to its resiliency. The uppermost end of each tooth 10 is suitably secured to one of two elongated transverse right angle members or left and right rake beams 20' and 20''. Such securing means preferably comprises a clip 22 which latter extends beneath the tooth 10 and on the sides thereof. Each clip 22 is secured to the respective beam 20 or 20' by means of bolts 24.

The teeth 10 are disposed in parallelism and are equidistantly spaced apart all along the two beams 20 and 20'. The beams 20 are disposed end to end in alignment and are attached to two transverse frame members or half-axles 30 by suitable means now to be described.

As best seen in Fig. 8 a short right angle member 34 is attached to the forward end of each of the axles 30. Like angle members 34 are disposed in spaced apart positions all along the axles 30. The angle members 34 are attached to the axles 30 by means of web members 38. The angle member 34 being secured by a weld 31 to the web 38 and the web secured to the axle 30 by a weld 33.

The web members 38 are substantially vertically disposed and apertures 40 are provided between each web member 38 and adjacent surfaces of the angle members 34.

On the forward and lower sides of the angle members 34, each of the latter is provided with a hook shaped mounting or connecting member 48 which latter is provided with two rearward surfaces disposed against the front and under sides respectively of the angle member 34. Bolts 50 are provided for securing the members 48 to the angle members 34.

The members 48 each extend forwardly, upwardly, then slightly rearwardly in a hook 47, the rearward end of each hook 47 being provided with an aperture therethrough for receiving a pin 60. The pins 60 each secure the respective hook member 48 to two spaced apart ears 64 which latter are themselves welded or otherwise secured to the downwardly extending forward surface 59 of the beam 20.

The axles 30 are preferably formed of pipe and are supported at their outer ends by two unlike wheel assemblies. The wheel assembly shown at the left in Fig. 1 is illustrated in detail in Fig. 4.

In Fig. 4 the wheel assembly shown includes a wheel 90 having an axle 92 mounted in an axle supporting block 94. An upstanding post 96 is secured to the block 94 and extends upwardly through a sleeve 98. The sleeve 98 is vertically disposed and is rigidly secured to a plate 100 which latter is rigidly secured, by any suitable means, to the outer end of the adjacent axle pipe 30.

On the underside of the axle pipe 30 a bracket 110 is provided. The bracket 110 extends downwardly from an inner portion of the axle 30, then extends outwardly a short distance, then upwardly at an inclination, being attached on its terminal inclined end to the plate 100. The bracket 110 has its respective ends suitably secured to the axle 30 and the plate 100.

The bracket 110 is secured by means of a bolt 114 to a toggle member 118. The member 118 is provided with a notch 124 therein which latter is disposed around and secured to the top of the block 94, as best seen in Fig. 7.

A link 126 is suitably secured to the inner end of the toggle member 118 and is disposed inclined rearwardly and outwardly therefrom. The rearwardmost end of the link 126 is provided with an aperture 128. The purpose of the aperture 128 is to receive the bolt 114 at times when the device is in a trailing position.

As best seen in Fig. 1 certain positions of the wheels are shown in dotted lines. These are the trailing positions thereof used when the device is being towed on the highway.

Figure 7:
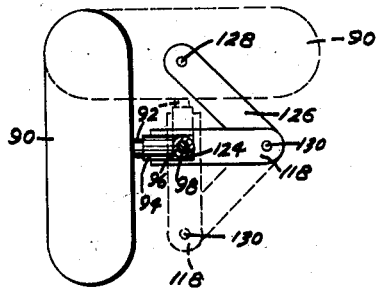
Fig. 7 is an enlarged top view with parts broken away and shown in section of the left rear wheel shown in Fig. 1.

Referring to Figs. 4 and 7, when the wheel 90 is placed in the dotted line position, the members 118 and 126 move forwardly, and the aperture 130 which extends through the inner end of the member 118 is not used. In its stead, the bolt 114 is placed through the aperture 128 for attaching the link 126 to the bracket 110.

The wheel 140 on the opposite right hand end of the axle is similarly provided with a stub axle 142 attached to a block 144. The block 144 is welded or suitably secured to a standard 148, which latter is secured to a plate 150, the latter being attached to the outer end of the adjacent axle pipe 30 by means later described. Two brace members 154 are provided, one forward and one rearwardly of the block 144. The braces 154 are attached rigidly to the block 144 on their outer ends and are attached on their inner ends to the plate 150.

A brace securing piece 160 is disposed across the top of the braces 154 and extends downwardly on the forward and rearward sides thereof. The member 160 is preferably secured in this position, as shown in Fig. 5.

Figure 5:
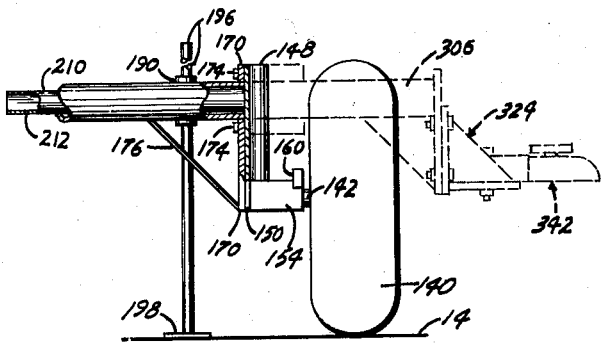
Fig. 5 is a view of the right wheel as seen along the line 5—5 of Fig. 1. The dotted lines of Fig. 5 show the towing tongue in a position in which it is placed in substitution for the right rear wheel preparatory to road travel, parts being broken away and shown in section for clarity of illustration.

A strengthening plate 170 is provided as shown in Fig. 5. The plate 170 is secured by means of bolts 174 to the plate 150 and the axle 30 is secured to the member 170.

The assembly is further braced by means of a strut 176, welded or otherwise, secured to the lower end of the member 170 as shown in Fig. 5, and the strut extends inwardly and upwardly therefrom, being secured to the axle 30.

Means are provided for holding the axle 30 above the ground at times when the wheel 140 is removed. Such means includes a sleeve 190 preferably welded or otherwise secured vertically to the rearward portion of the axle 30 adjacent the wheel 140. A standard 196 is slidably disposed through the sleeve 190 and has a foot 198 on its lower end for engaging the ground. A bolt 200 is provided through the sleeve for securing the standard 196 in a desired position.

An inner pipe, or rounded bar 210 is disposed in the right hand outer end of the axle 30. The pipe 210 is provided with a horizontal bore 212 therethrough for receiving a member later described. The bar 210 is secured at its outer end to the plate 150. It will be seen that by removing the bolts 174, the wheel 140 and its adjacent associated parts including the bar 210 can be removed.

The purpose of this removal is best seen in Fig. 1, in which the wheel 140 is placed to the rear of the teeth 10 and adjacent the transverse center of the rake. The wheel 140 is there shown in trailing position and the bar 210 extends rearwardly from a forwardly and rearwardly extending pipe frame member 230 comprising a center frame section of the rake.

Referring to Fig. 9, the member 210 is shown extending into the rearward end of the pipe 230 and is secured in that position by means of a bolt 234 which latter extends through the pipe 230 and the bar 210. The bolt 234 has its nut on its lower end welded to the longitudinal member 230. On the upper end of the bolt a washer is provided. The position of the bar 210 in Fig. 9 corresponds to the dotted line position thereof shown in Fig. 1.

The main longitudinal pipe 230 is braced in a position at a right angle to the axles 30 by means of two elongated bracing pipes 250. Each pipe 250 extends forwardly and inwardly from an outer end of the axle 30. The pipes 250 are provided at their forward and rearward ends with forward and rearward welded plates 252 and 252' respectively secured thereto. The purpose of the plates 252 are for reception between tabs 258 which latter, together with the bolts 260, attach the ends of the pipe respectively to the axles 30 and to a connecting plate 270. The connecting plate 270 is also shown in Fig. 2. Two braces 274 are provided for securing the plate 270 to the pipe 230.

As best seen in Figs. 1 and 3, the longitudinal pipe 230 is provided at its forward end with a flange 300 and a longitudinal pipe extension 306 extends forwardly of the pipe 230. The extension 306 is provided with a rearward flange 308 which latter is secured by means of bolts 310 to the flange 300. Webs 314 are provided for strengthening the flange 308.

The extension 306 is provided at its forward end with a flat vertically disposed plate 320 which latter is preferably welded to the forward end of the extension 306.

A triangularly shaped bracing plate 322 is vertically disposed beneath the extension pipe 306 and adjacent the rearward surface of the plate 320, having one of its legs preferably welded to the rearward surface of the plate 320 and the other of its legs likewise suitably secured to the under side of the extension 306.

A trailer hitch mounting bracket generally shown at 324 is attached to the forward surface of the plate 320. The mounting bracket 324 includes an upright plate 330 adjacent from the lower surface of the plate 320 to which two right angle triangularly shaped spaced apart parallel forwardly extending plates 334 are suitably secured by welding as indicated by the numeral 301.

The rearward vertically disposed legs of each of the two triangularly shaped plates 334 are suitably welded to the forward surface of the plate 330. To the lower side of the lower horizontally extending legs of the two triangularly shaped plates is secured a horizontally disposed flat plate 336. The mounting bracket is rigidly secured to the forward surface of the plate 320 by means of bolts 340.

A trailer hitch mounting bracket constructed in this manner forms a means by which a standard ball and socket trailer hitch generally shown at 342 may be mounted and secured in its position by means of bolts 344 and 346. The ball of the ball and socket trailer hitch 342 may be mounted on any desired towing vehicle. As seen in Fig. 1, the ball is mounted on a drawbar and ball assembly 348 of a tractor generally indicated by the numeral 349.

As best seen in Fig. 3, a pipe 400 is disposed extending from the plate 320 through the extension 306 and into the longitudinal pipe 230. The pipe 400 is welded or suitably secured at its outer end to the plate 320 whereby at times when the extension 306 is removed from the longitudinal pipe 230, the pipe 400 comes out with the pipe 306.

As best seen in Fig. 5, the dotted lines there shown represent the extension 306 and adjacent trailer hitch and mounting bracket in a position for highway travel. When so disposed, the pipe 400 seen in Fig. 3 is inserted into the pipe 30 shown in Fig. 5 at a time when the wheel 140 and associated parts are removed.

Figure 6:
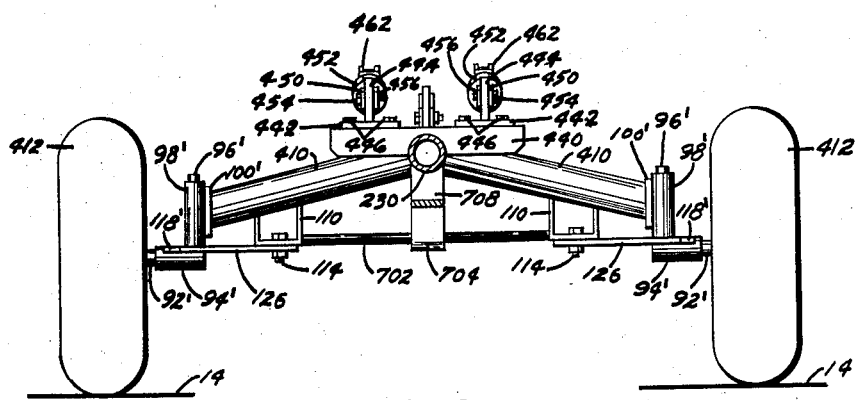
Fig. 6 is an enlarged view-in-section as seen along the line 6—6 of Fig. 1.

Referring to Fig. 1, two spaced apart front axle pipes 410 are disposed in alignment transversely of the direction of the longitudinal frame member 230. The axle pipes 410 are sloped downwardly at their outer ends as best shown in Fig. 6. Two wheels 412 are attached to the ends of the axle pipes 410. The wheels 412 are attached in the same manner in which the wheel 90 is secured to the axle pipe 30 as is more fully described in Fig. 4. For this reason the wheel assembly areas of wheels 412 are only given the general numeral 420 as designated.

All parts of the wheel assembly of the wheels 412 which are similar to the wheel assembly of the wheel 90, as shown in Fig. 4, are given similar, but prime numerals, as best seen in Fig. 6.

Above the pipe 230 and slightly forward of the wheels 410, a platform is provided. The said platform comprises a transverse member 440 having downwardly extending forward and rearward sides which latter are secured to the pipe 230.

Above the transverse member 440 and at the ends thereof, two mounting pieces 442 with upwardly extending longitudinally disposed lugs 444 are provided. The mounting pieces 442 are secured to the transverse member 440 by means of bolts 446.

The lugs 444 are for the purpose of receiving clevices 450 which latter are rigidly secured to the forward ends of a pair of cylinders 452 of hydraulic jacks. The clevices 450 are pivotally mounted about the lugs 444 by means of pins 454 and cotter keys 456.

The cylinders 452 of the hydraulic jacks are provided with piston rods 460 which latter are provided at their rearward ends with clevices 462 suitably secured thereto. The clevices 462 are disposed about upwardly extending lugs 464 and are pivotally secured thereto by means of pins 470.

Each of the pair of lugs 464 is welded or otherwise secured to the upper surface and adjacent the inner end of one of the two rake beams 20 and 20'.

The cylinders 452 of the hydraulic jacks are provided with hydraulic hoses 472 and 474 which latter extend rearwardly from their connections on the tractor 349.

The hose 472 extends rearwardly to a T joint. Rearwardly extending elbows are attached to the ends of the transverse portion of the T joint from which extend shorter lengths of hose which latter are connected to the forward hose connections of the cylinders 452.

The hose 474 extends rearwardly and is connected to a like arrangement of a T joint and elbows whereby the shorter lengths of hose which branch from the hose 474 are connected to each of the rearward hose connections of the cylinders 452.

As thus described, when hydraulic power is applied to the jacks 452 through the hose 472 the teeth and the associated members are held in a position for raking.

When hydraulic power is applied to the jacks through the hose 474 the teeth and associated members are caused to assume the dotted line position shown in Fig. 8.

Means are provided for carrying the hydraulic hoses 472 and 474 above the longitudinal member 230 and extension 306. This portion of the device includes a short vertically disposed pipe 476 welded or otherwise secured to the front surface of the plate 330 of the hitch mounting bracket generally shown at 324.

A short section of larger diameter longitudinally disposed pipe 478 is preferably welded to the upper end of the pipe 476 through which pass the hoses 472 and 474.

As best seen in Figs. 9 and 10, the inner ends of the pipe axles 30 are each provided with a transverse sleeve 602 preferably welded thereto. The sleeve 602 is for the purpose of receiving bolts 604 therethrough. Since the bolts are rotatably received, each sleeve 602 is provided with an oiling aperture having a cap 610 thereover.

The bolts 604 are each disposed through the ends of two spaced apart transverse plates 613. The plates 613 are disposed about the longitudinal pipe 230 and are welded thereto. As thus described the axle pipes 30 are adapted to conform to the surface of the ground. Pins 611 and washers 612 are disposed on the forward ends of the bolts 604.

Braces are provided for holding the front axle pipes 410 at right angles to the longitudinal member 230. These braces include two elongated rearwardly inwardly and slightly upwardly extending plates 618 having their forward ends each suitably secured to one of the two plates 100 on the outer ends of the axle members 410 and their rearward ends suitably secured to the forward transverse plate 613, one on each side of the member 230.

Cross bracing is provided beneath the axle pipes 410. Such bracing includes a bracing pipe 702 extending between and secured to the brackets 110 which latter are similar to but slightly different from the brackets 110 of the wheel 90. A strap brace 704 is provided, as best seen in Fig. 6. The strap brace extends upwardly and is secured to the pipe 230.

The strap 704 extends under the pipe 702 and then upwardly again, being secured at its rearward end to the longitudinal pipe 230. In addition to the strap 702, a vertically disposed brace 708 is provided extending downwardly from the pipe 230 and suitably secured to the upper side of the strap 704.

Means are provided for locking the teeth 10 in the upper position shown in dotted lines in Fig. 8. Such means include an elongated hook member 800 which is pivotally secured at its forward end between nibs by means of a bolt, as best seen in Fig. 6.

The rearward end of the member 800 extends downwardly in the shape of a hook.

A clasp generally shown at 806 and made preferably of resilient material includes a bar 808 having one end welded to the upper surface of the left beam 20 adjacent the lug 456.

The bar 808 extends rearwardly for a short distance, and then transversely past the inner end of the opposite or right beam 20'.

Yet another bar 810 has one of its ends welded to the upper surface of the opposite or right beam 20' and extends rearwardly over and around the transverse portion of the bar 808 leaving an opening therein which engages the bar 808 and forms the locking device of the clasp.

Constructed in this manner the clasp, when not fastened, permits the elevation of the beams 20 and 20' to the dotted line position shown in Fig. 8 independent of the other.

When the clasp is fastened, as may best be seen in Figs. 1 and 2, the two beams 20 and 20' are raised or lowered as a unit.

When the teeth are desired to be locked in the upright position, the hydraulic jacks are used to place the teeth in said position. The hook member 800 is then lifted and dropped in place so that the hook may engage the transverse portion of the bar 808, thus locking the teeth in the upright position for highway travel.

I claim:
1. A hayrake comprising: a center frame section attachable to a towing vehicle during raking; wheels supporting said center frame section; two elongated spaced apart transverse frame members arranged end to end on each side of said center frame section, said transverse frame members being each pivotally attached to said center frame section for upward and downward swinging movement of their outer ends; wheels supporting the outer ends of said transverse frame members; two transverse rake beams arranged end to end alongside respective transverse frame members, said rake beams being spaced substantially forward of said transverse frame members; means pivotally securing said rake beams each to the adjacent one of said transverse frame members for the pivoting of said rake beams about normally horizontal transverse axes; and teeth attached to said rake beams and extending downwardly therefrom.

2. The combination of claim 1 in which said teeth have lower ends disposed approximately in alignment with the bottom of said wheels as seen looking lengthwise of said rake beams.

References Cited in the file of this patent

UNITED STATES PATENTS

| | | |
|---|---|---|
| 1,502,507 | Link | July 22, 1924 |
| 1,815,330 | Robinson | July 21, 1931 |
| 2,237,280 | Coultas et al. | Apr. 1, 1941 |
| 2,672,721 | Adams | Mar. 23, 1954 |